(12) United States Patent
Marshall

(10) Patent No.: US 8,249,663 B2
(45) Date of Patent: Aug. 21, 2012

(54) METHOD AND DEVICE FOR FILE VIEWING USING A MOBILE DEVICE

(75) Inventor: Graham Marshall, Shoreham, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 312 days.

(21) Appl. No.: 12/427,401

(22) Filed: Apr. 21, 2009

(65) Prior Publication Data

US 2010/0267422 A1  Oct. 21, 2010

(51) Int. Cl.
*H04M 1/00* (2006.01)

(52) U.S. Cl. ........ 455/566; 455/418; 342/114; 345/156; 345/157; 345/158; 345/169; 345/659; 375/E7.263

(58) Field of Classification Search .......... 455/418, 455/566; 342/114; 345/156–158, 169, 649, 345/659; 375/E7.263
See application file for complete search history.

(56) References Cited

U.S. PATENT DOCUMENTS

| | | | | |
|---|---|---|---|---|
| 6,556,185 | B2 * | 4/2003 | Rekimoto | 345/157 |
| 7,475,360 | B2 * | 1/2009 | Keohane et al. | 715/786 |
| 2007/0070395 | A1 * | 3/2007 | Ahne et al. | 358/1.15 |
| 2009/0005018 | A1 * | 1/2009 | Forstall et al. | 455/414.1 |
| 2009/0066637 | A1 * | 3/2009 | McCall | 345/156 |

* cited by examiner

*Primary Examiner* — Amancio Gonzalez

(57) ABSTRACT

A method including loading a data file into a memory of a mobile computing device, displaying a portion of the data file on a display of the mobile computing device, detecting user motion data corresponding to a motion of the mobile computing device by a user, the motion being indicative of the user's desire to view a further portion of the data file, and displaying the further portion of the data file on the display as a function of the user motion data.

2 Claims, 5 Drawing Sheets

METHOD AND DEVICE FOR FILE VIEWING USING A MOBILE DEVICE

BACKGROUND

As the capabilities of mobile computing devices increase, such devices may be used to obtain and display large amounts of information. This may include information that is displayed graphically, such as maps, schematics, other images, web pages, spreadsheets, or other types of graphically displayed information. Existing methods for panning the display of such graphical information may require the use of both of a user's hands.

SUMMARY OF THE INVENTION

The present invention is directed to a method comprising loading a data file into a memory of a mobile computing device, displaying a portion of the data file on a display of the mobile computing device, detecting user motion data corresponding to a motion of the mobile computing device by a user, the motion being indicative of the user's desire to view a further portion of the data file, and displaying the further portion of the data file on the display as a function of the user motion data.

The present invention is further directed to a mobile computing device comprising a memory storing a data file, a display displaying a portion of the data file, and a motion detection sensor sensing user motion data corresponding to a motion of the mobile computing device by a user. The motion is indicative of the user's desire to view a further portion of the data file. When the motion detection sensor detects the user motion data, the display displays the further portion of the data file as a function of the user motion data.

The present invention is further directed to a mobile computing system comprising storage means for storing a data file, display means for displaying a first portion of the data file, motion sensing means for sensing a motion of the mobile computing system by a user, the motion corresponding to the user's desire to view a second portion of the data file on the display means, and display manipulation means for displaying, using the display means, the second portion of the data file as a function of the motion of the mobile computing system.

DETAILED DESCRIPTION

Figure 1A:
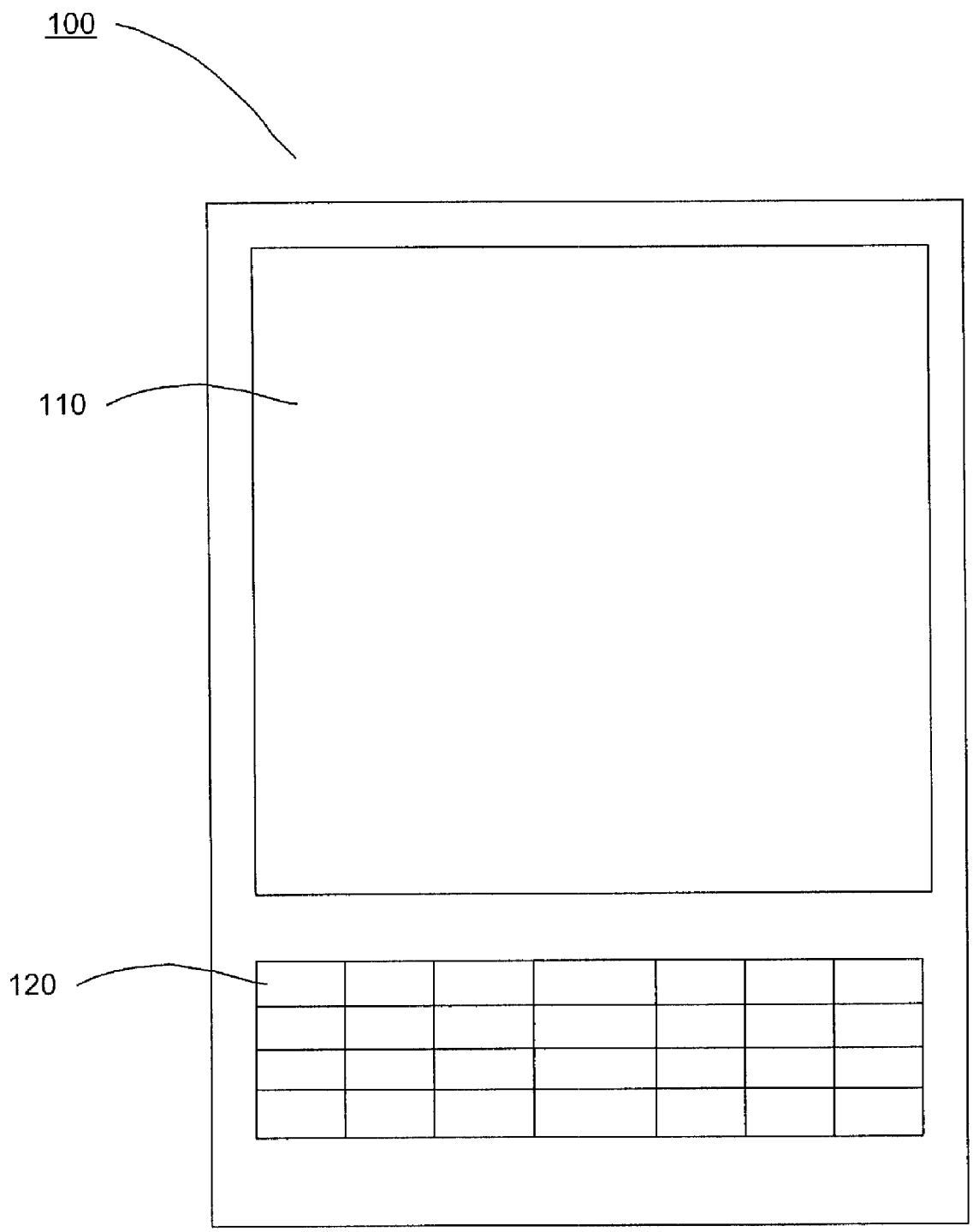
FIG. 1A shows an exemplary embodiment of a mobile computing device according to the present invention for manipulating the display of a data file according to the exemplary method of FIG. 3.

The exemplary embodiments of the present invention may be further understood with reference to the following description and the appended drawings, wherein like elements are referred to with the same reference numerals. The exemplary embodiments describe devices and methods for enabling a user to more easily manipulate data displayed by a mobile computing device. In the exemplary embodiments, a user may define an anchor point and subsequently manipulate the display of a data file with relation to that anchor point by physically moving the mobile device.

Figure 1B:
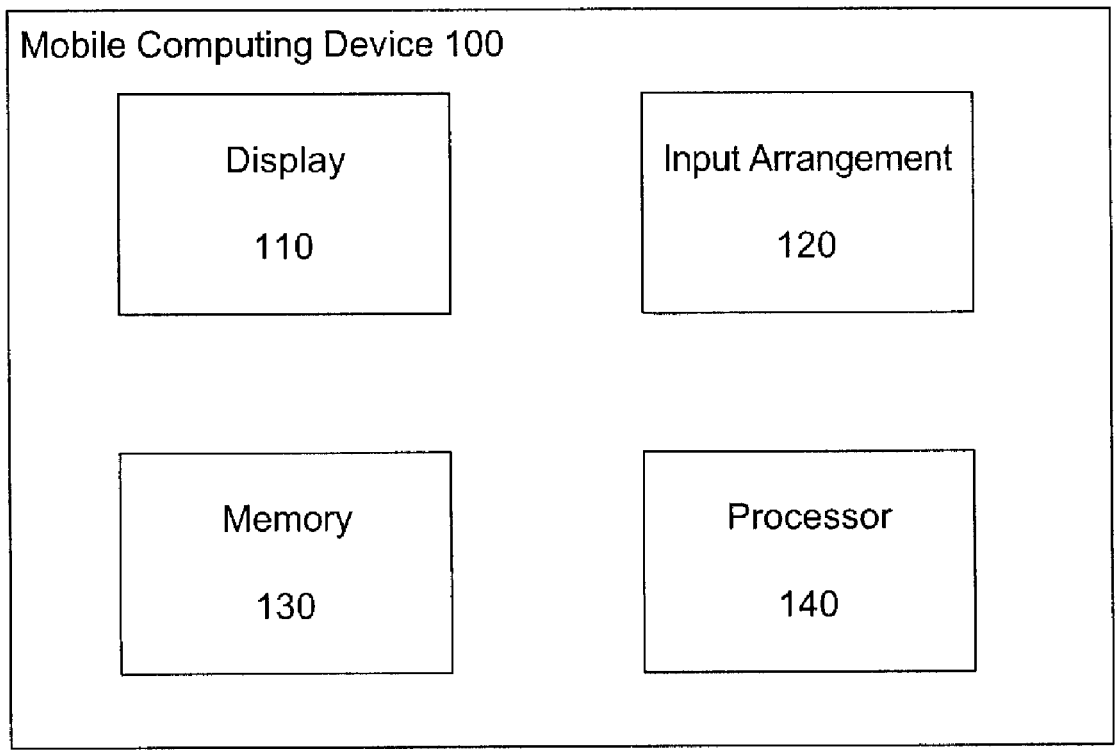
FIG. 1B shows a schematic view of the exemplary embodiment of FIG. 1A of a mobile computing device according to the present invention.

FIGS. 1A and 1B illustrate an exemplary mobile computing device 100 according to the present invention. FIG. 1A illustrates an external view of the exemplary device 100, while FIG. 1B provides a schematic view of the same device 100. The device 100 may be, for example, a palmtop computer, personal digital assistant ("PDA"), mobile phone, scanner, imager, multimedia player, or any other device capable of displaying the data file of FIG. 2 and performing the method of FIG. 3. The device 100 includes a display 110 and a user interface 120. In other embodiments, the user interface may 120 be integrated into the display 110, such as an on-screen keyboard. The device 100 also includes a memory 130 and a processor 140, which are shown schematically in FIG. 1B. The memory 130 may store an operating system, software, data files, etc., as known in the art. The memory 130 may include a long-term storage (e.g., a hard drive, a flash memory, etc.) and/or a short-term storage (e.g., random access memory).

Figure 2:
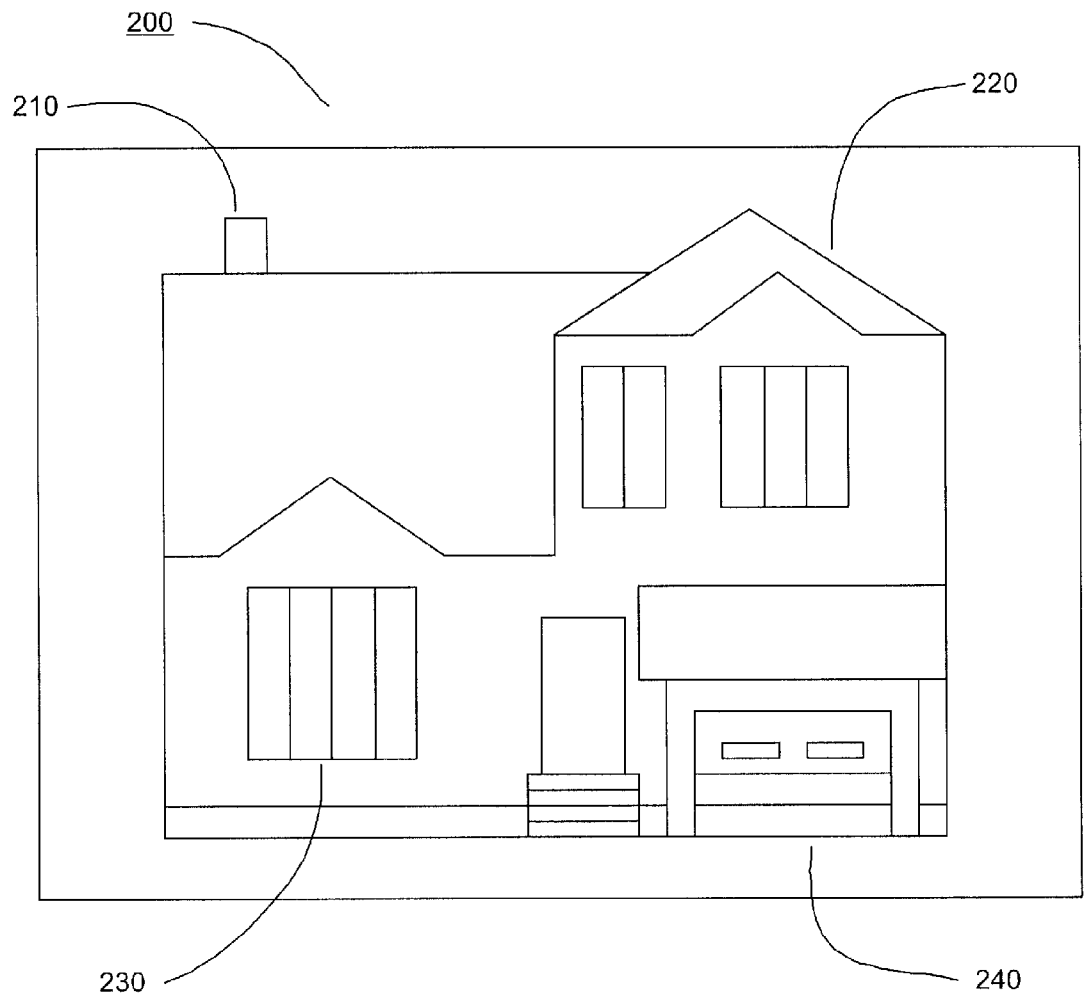
FIG. 2 shows an exemplary embodiment of the data file according to the present invention displayed by the device of FIGS. 1A and 1B.

FIG. 2 illustrates an exemplary data file 200. The data file 200 may be stored in the memory 130 of the device 100; alternately, the data file 200 may be stored remotely and accessed by a communications interface of the device 100 (e.g., a Bluetooth connection, a WiFi connection, a cellular connection, etc.). The data file 200 illustrated in FIG. 2 is a picture of a house; however, the principles of the present invention may be equally applicable to other data files that a user may wish to display at a scale such that the entire data file cannot be simultaneously viewed on the display 110. The data file 200 may include a plurality of features 210, 220, 230 and 240. In the exemplary data file 200 shown in FIG. 2, feature 210 is a chimney, feature 220 is a roof, feature 230 is a window and feature 240 is a garage; however, those of skill in the art will understand that this is only exemplary and that in other embodiments other features may be possible, that photographic representations (e.g., satellite photographs) may be used rather than the symbolic representations of FIG. 2, and that other types of features may be present if the data file 200 is a different type of data file (e.g., the features may be groups of cells if the data file 200 is a spreadsheet, segments of text if the data file 200 is a text document, buildings if the data file 200 is a map, etc.).

Figure 3:
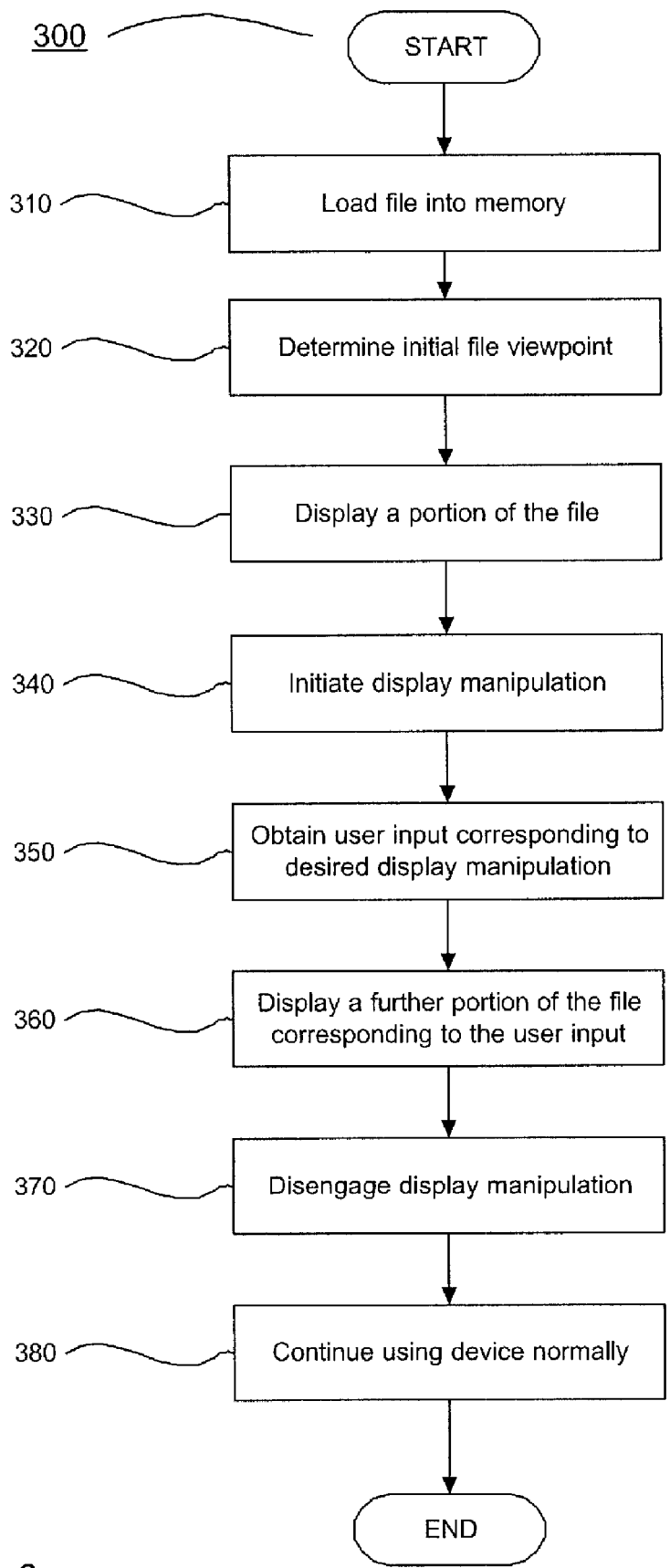
FIG. 3 shows an exemplary method for manipulating the display of the exemplary data file of FIG. 2 on the mobile device of FIGS. 1A and 1B.

FIG. 3 illustrates an exemplary embodiment of a method 300 according to the present invention by which a user of the device 100 may manipulate the display of the exemplary data file 200 of FIG. 2. In step 310, the data file 200 is loaded into the memory 130 of the device 100. This may involve loading the data file 200 into an already active application, initiating a software application appropriate to the nature of the data file 200 and loading the data file 200 from the memory 130, switching an application including the data file 200 from a background status to a foreground status, etc. Those of skill in the art will understand that there are many such methods and that the method by which the data file 200 is loaded may typically depend on the nature of the data file 200.

Figure 4A:
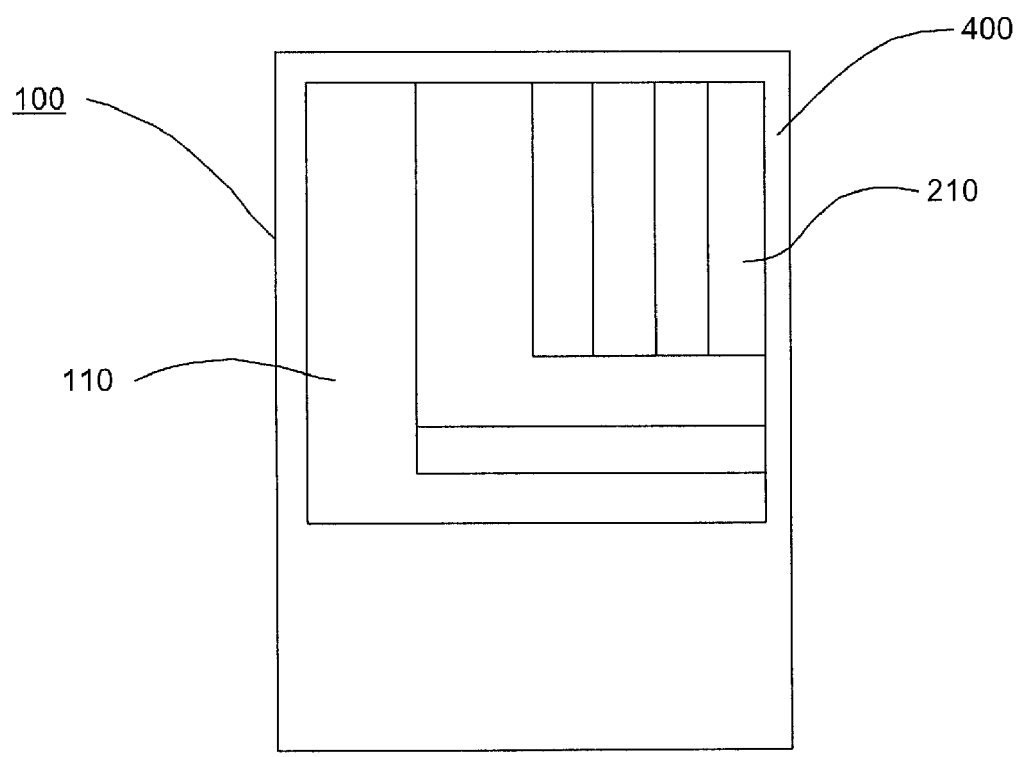
FIG. 4A shows an exemplary initial view of the data file of FIG. 2 as shown on a display of the device of FIGS. 1A and 1B at a first point during the execution of the exemplary method of FIG. 3.

In step 320, an initial view of the data file 200 is established. The initial view may be a default view (e.g., a centered view of a map, the top left of a text document, etc.) or may be established by standard method of modifying the view of a data file 200 (e.g., navigation using arrow keys, click and drag panning, etc.). FIG. 4A illustrates the device 100 showing an exemplary initial view 400 of the data file 200. As will be apparent, the initial view 400 represents a view of the lower-left portion of the data file 200 including feature 230. In step 330, the initial view of the data file 200 is displayed on the display 110.

In step 340, the user of the device 100 initiates the display manipulation process. This may be accomplished by a dedicated input arrangement (e.g., pushing a button that serves this function) or by another type of input (e.g., a button on the touch-sensitive display 110 or the user interface 120). In a preferred embodiment, the device 100 may include a button on user interface 120 that is specifically designated/preprogrammed for this purpose; such a button may be designated "View" or another similar label. In some exemplary embodiments, the user may be required to hold such a button down while the display 110 is manipulated; in others, the button may be pressed once to engage the process and a second time to disengage it.

In step 350, the user indicates a desired manipulation of the data file 200 on the display 110 by physically moving the device 100. The motion of the device 100 may be sensed by any of the various mechanisms known in the art, such as by an embedded motion sensor, an accelerometer, a sensor external to the device, etc. The processor 140 may then receive such motion as an input and adjust the appearance of the data file 200 on the display 110 accordingly. Motion may be, for example, upward or downward, to either side, or a combination of the two. Such motion in the plane of the display 110 may typically pan the display of the data file 200 correspondingly. Additionally, motion may be rotational; rotation of the device 100 about an axis may correspondingly rotate the view of the data file 200 about the axis of rotation. Further, motion may be perpendicular to the plane of the display 110; such motion may zoom the display 110 of the data file 200. Manipulation may be limited to one of the above types of motion (e.g., only panning) or may include more than one (e.g., panning and zooming). In some exemplary embodiments, the device 100 may display a target (e.g., crosshairs) or other cursor in the display 110 to indicate to the user where the view is centered. In accordance with the above, in step 360 a further view of the data file 200 is shown on the display 110.

Figure 4B:
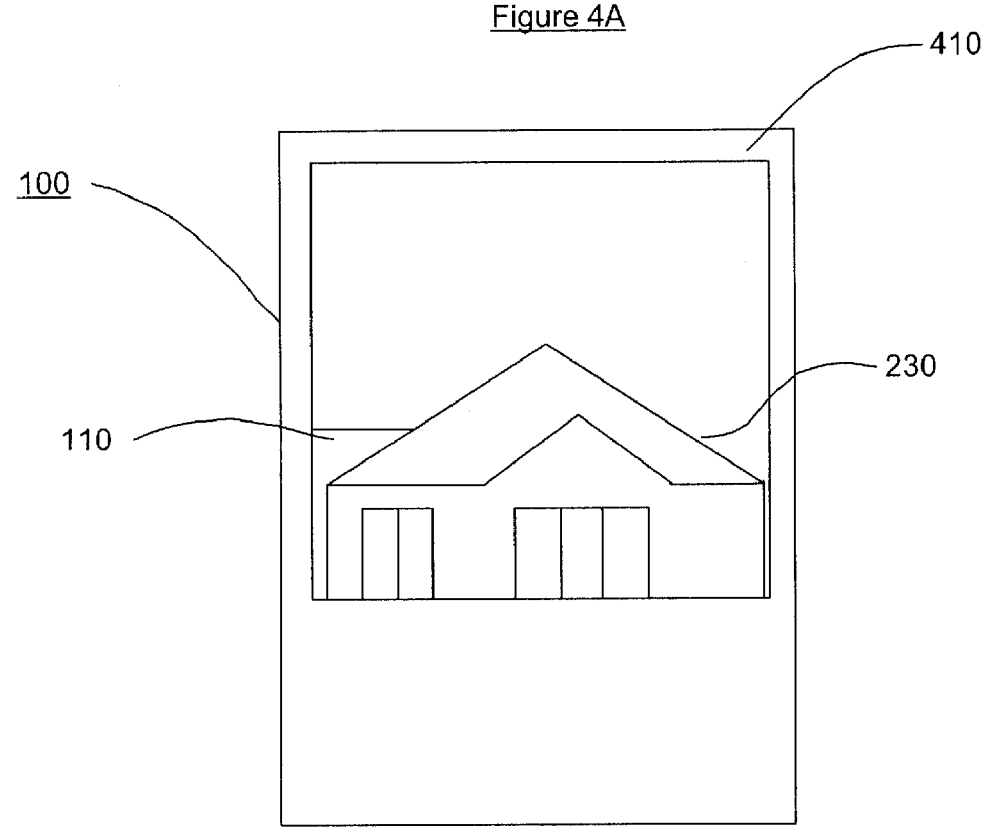
FIG. 4B shows an exemplary final view of the data file of FIG. 2 as shown on a display of the device of FIGS. 1A and 1B at a second point during the execution of the exemplary method of FIG. 3.

FIG. 4B illustrates the device 100 showing an exemplary modified view 410 of the data file 200. As will be apparent, the modified view 410 represents a view of the upper-right portion of the data file 200 including feature 230. Those of skill in the art will understand that such a modified view may be achieved by moving the device 100 upward and to the right. Alternately, it will be apparent the user could instead move the device 100 straight upward and arrive at a modified view showing the feature 210, or could move the device 100 straight to the right and arrive at a modified view showing the feature 240.

In step 370, the user disengages the display manipulation process. This may be a reversal of the user action taken in step 330. For example, if the user pressed a button once to engage the process in step 330, the user may disengage the process by pressing the same button a second time, or by pressing a different button. If the user pressed and held a button to engage the process, the user may disengage by releasing the button. After step 350, motion of the device 100 may no longer be reflected on the display 110 as described above with reference to step 340. Subsequently, in step 380, the user may continue using the device 100 as normally and in accordance with any of the various software applications that may operate on the device 100. After step 380, the method terminates.

The exemplary embodiments may make it simpler and faster for a user to adjust the view of large data files displayed on a mobile device. This may be accomplished with one hand, leaving the user's other hand free for other tasks. Further, only a button may be required to accomplish the view adjustment, resulting in fewer and simpler external moving parts than other mechanisms for the same task, such as scroll wheels, track balls or navigation keys. Additionally, this adjustment may be intuitive for many users.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalents.

What is claimed is:

1. A method, comprising:
   loading a data file into a memory of a mobile computing device;
   displaying a portion of the data file on a display of the mobile computing device;
   defining an anchor point for the displayed data file where the anchor point is represented by an indicia that remains fixed on the same point of the data file;
   detecting rotational user motion about an axis perpendicular to a plane of the display of the mobile computing device by a motion sensor of the mobile computing device, the detected user motion being used to rotate the display of the data file about the fixed anchor point, wherein the anchor point remains centered on the display and the displayed portion of the data file remains center at the anchor point; and
   rotating the displayed portion of the data file about the anchor point on the display as a function of the user rotational motion.

2. A mobile computing device, comprising:
   a memory operable for storing a data file;
   a display operable for displaying a portion of the data file and an anchor point represented by an indicia that remains fixed on the same point of the data file;
   a processor for defining the anchor point for the displayed data file; and
   a rotational motion detection sensor sensing rotational user motion about an axis perpendicular to a plane of the display of the mobile computing device by the motion detection sensor, the detected user motion being used by the processor to rotate the display of the data file about the fixed anchor point, wherein the anchor point remains centered on the display and the displayed portion of the data file remains center at the anchor point, and
   wherein, when the motion detection sensor detects the user rotational motion, the display rotates the displayed portion of the data file about the anchor point on the display as a function of the rotational motion.

* * * * *